UNITED STATES PATENT OFFICE.

ERWIN KUH, OF VIENNA, AUSTRIA.

PROCESS FOR THE PRODUCTION OF NEUTRAL ALKYL ESTERS OF SULPHURIC ACID.

1,411,215. Specification of Letters Patent. Patented Mar. 28, 1922.

No Drawing. Application filed September 11, 1920. Serial No. 409,624.

*To all whom it may concern:*

Be it known that I, ERWIN KUH, a citizen of the Republic of Czecho-Slovakia, residing at Vienna, Austria, have invented certain new and useful Improvements in Processes for the Production of Neutral Alkyl Esters of Sulphuric Acid, (for which I have made application in Austria August 8, 1919,) of which the following is a specification.

This invention relates to new and improved methods for the production of neutral alkyl esters of sulphuric acid especially diethyl sulphate.

For the technical production of dialkyl sulphates which are in growing demand as alkylating agents, it is usual to start with pure alkyl sulphuric acid. Thus, for instance, the acid methyl ester of sulphuric acid gives a satisfactory yield of dimethyl sulphate by direct distillation in vacuo. However for the production of diethyl sulphate, this method has great disadvantages on account of diethyl sulphate being very sensitive towards high temperatures in the presence of sulphuric acid. Briefly expressed, the splitting of ethyl sulphuric acid in vacuo is effected as follows:

I. $2(C_2H_5)HSO_4 = (C_2H_5)_2SO_4 + H_2SO_4$, the free sulphuric acid generated acting as a saponifying agent on the ethyl sulphate. As a matter of fact the yield cannot be increased much above 50% of the theoretical quantity even when a pressure not exceeding 1 mm is employed, so that in order to make the operation more economical, tedious and expensive technical measures have to be employed for recovering the excess of alcohol.

For improving the yield it has been proposed instead of distilling the free ester acid, to distil the dry sodium salt of the latter in vacuo. Splitting the salt naturally results in the final production, not of free sulphuric acid, but of its sodium salt:

II. $2(C_2H_5)NaSO_4 = (C_2H_5)_2SO_4 + Na_2SO_4$.

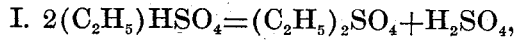

This method gives a considerably better yield in comparison with the distillation of free ester acid, which yield, for example, in the production of diethyl sulphate, can be raised to 80% of the theoretical quantity. The transformation of ethyl sulphuric acid into its sodium salt is, however, costly, because the ester acid has to be brought into very dilute solution from which the dry sodium salt has afterwards to be recovered, a method which not only increases the difficulties, but is also attended with loss.

It has now been found that the formation of dialkyl sulphates by distilling the free ester acids occurs almost quantitatively, even under a very moderate vacuum, if care is taken that the sulphuric acid, generated during the splitting of the ester acids according to the equation I, is combined as a salt during the reaction itself. As cathion carrier any compound may be introduced into the reaction which neither in itself nor after the substitution of hydrogen for the metal, exerts a saponifying or other injurious action on the ester acids or upon the dialkyl sulfates. Inasmuch as, for example, the acid salts of the polybasic acids are innocuous in this sense, the first method that suggests itself for carrying out this novel solution of the problem is to distil the alkyl sulphuric acid with an equivalent amount of neutral salts of polybasic fixed acids or secondary salts of fixed acids of higher basicity, for example, by the addition of dry neutral sodium sulphate, in which case the reaction proceeds as follows:

$2\text{Alkyl}HSO_4 + Na_2SO_4 =$
$(\text{Alkyl})_2SO_4 + 2NaHSO_4$.

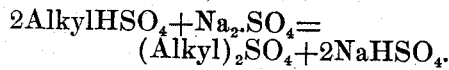

A special way of carrying out the present invention is to prevent the formation of free sulphuric acid during the splitting of the ester acid, by distilling with addition of a salt of the ester acid in question as is represented, for example, in the case of ethyl sulphuric acid, by the following equation:

$(C_2H_5)HSO_4 + C_2H_5NaSO_4 =$
$(C_2H_5)_2SO_4 + NaHSO_4$.

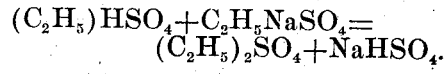

It is remarkable that dialkyl sulphate is readily and almost quantitatively obtained by distilling the comparatively unstable alkyl sulphuric acid salts (which are very susceptible to the action of acids) with equivalent quantities of free alkyl sulphuric acid under reduced pressure (the reduction of pressure to an absolute pressure of 15 m.m. of mercury is quite sufficient). The technical importance of this way of carrying out the invention is increased by the fact that most alkylations carried out in alkaline media transform the dialkyl sulphate into recoverable sodium alkyl sulphate from which the neutral sulphuric acid ester is recoverable by distillation along with the equivalent molecular amount of alkyl sulphuric acid.

Accordingly instead of adding equivalent amounts of a salt capable of combining with sulphuric acid, in accordance with the foregoing, smaller amounts in admixture with a salt of the ester acid in question may be employed in the reaction in order to prevent the alkyl sulphuric acid from being resaponified.

Following is an example of a preferred method in accordance with my invention. The invention, however, is not restricted to the specific operating conditions and manipulations set forth in the example.

In a vessel provided with stirrers, 252 parts of ethyl sulphuric acid and 150 parts of dehydrated sodium sulphate are distilled under an absolute pressure of 10–15 mm. mercury. The ester acid is preferably added gradually to the heated sodium sulphate during distillation, the contents of the vessel throughout the distillation being thus kept in a dry pulverulent condition. The diethyl sulphate formed starts to distil over between 90–100° C., and at about 160 to 170° the distillation is complete. The yield is about 85% of the theoretical. As another example of carrying out my invention it may be stated that by heating a mixture of 20 parts of dehydrated sodium sulphate and 111 parts of dry sodium ethyl sulfate and adding gradually 126 parts of free ethyl sulphuric acid, the details of practice correspond to the above. The yield is about 85–90% of the theoretical.

I claim:

1. A process for the production of a neutral alkyl ester of sulphuric acid which comprises distilling a free alkyl sulphuric acid under reduced pressure, while in admixture with a salt capable of reacting with sulphuric acid with the formation of an acid salt, which salt itself and the acid salt formed by reaction thereof with sulphuric acid are both inert toward the alkyl ester.

2. The process for the production of a neutral alkyl ester of sulphuric acid which comprises distilling a free alkyl sulphuric acid under reduced pressure, while in the presence of a salt of a fixed polybasic acid, which salt has metal satisfying a plurality of the valancies of the acid radical thereof, and which salt is capable of combining with sulphuric acid, and which salt and the acid salt formed by the reaction with sulphuric acid are both inert to the ester acid.

3. A process for the production of a neutral alkyl ester of sulphuric acid which comprises distilling a free alkyl sulphuric acid under reduced pressure while in the presence of about an equivalent molecular amount of a neutral salt of a fixed polybasic acid which salt neither in itself nor after the substitution of hydrogen for a part only of its content of metal, will exert a saponifying or other decomposing action upon the ester acid or upon the neutral alkyl ester.

4. A process for the production of a neutral alkyl ester of sulphuric acid which comprises distilling a free alkyl sulphuric acid under a reduced pressure with the addition of a neutral salt of polybasic fixed acid which salt is inert to di-alkyl sulphate and to the alkyl sulphuric acid.

5. The process for the production of a neutral alkyl ester of sulphuric acid which comprises distilling a free alkyl sulphuric acid under reduced pressure with the addition of dry neutral sodium sulphate.

6. The process for the production of a neutral alkyl ester of sulphuric acid which comprises distilling a free alkyl sulphuric acid under reduced pressure with the addition of a neutral salt of a polybasic fixed acid, which salt and also the salt formed by the substitution of hydrogen for a part only of its content of metal, are both inert toward the ester acid, such salt being initially added in less than the equivalent molecular amount and in admixture with a salt of the ester acid in question.

7. A process for the production of an alkyl ester of sulphuric acid which comprises distilling free alkyl sulphuric acid under reduced pressure with the addition of a salt of a polubasic fixed acid which is inert toward di-alkyl sulphate and with a salt of the said alkyl sulphuric acid.

8. The process for the production of a neutral alkyl ester of sulphuric acid which comprises distilling a free alkyl sulphuric acid under reduced pressure with the addition of dry neutral sodium sulphate added in amount less than the equivalent molecular amount and in admixture with a salt of the ester acid in question.

9. The process for the production of diethyl sulfate which comprises distilling free ethyl sulphuric acid under reduced pressure, while in the presence of a salt of a polybasic fixed acid capable of combining during the reaction itself, with the sulphuric acid generated by the splitting of the ethyl sulphuric acid, so as to form a compound which, like such mentioned substances, is inert toward ethyl sulphuric acid and toward diethyl sulfate.

10. The process for the production of diethyl sulfate which comprises distilling free ethyl sulphuric acid under reduced pressure with the addition of a salt of a polybasic fixed acid containing in the molecule at least two atoms of metal, which salt and also the reaction products left after substitution of hydrogen for metal, are inert toward diethyl sulfate.

11. The process for the production of diethyl sulfate which comprises distilling free ethyl sulphuric acid under reduced pressure with the addition of a neutral salt of a fixed polybasic acid which salt, and also the reaction product left after the substitution of hydrogen for metal, are inert toward diethyl sulfate.

12. The process for the production of diethyl sulphate which comprises distilling free ethyl sulphuric acid under reduced pressure with the addition of dry neutral sodium sulphate.

13. The process for the production of diethyl sulfate which comprises distilling free ethyl sulphuric acid under reduced pressure with the addition of a neutral salt of a fixed polybasic acid, which salt as well as the reaction product left after the substitution of hydrogen for a part only of its metal content, are both inert toward ethyl sulfate and toward ethyl sulphuric acid, such salt being added in amount less than the equivalent molecular amount and while in admixture with an ethyl sulfate of a metal.

14. A process of making diethyl sulphate which comprises distilling ethyl sulphuric acid under pressure below atmospheric with the addition of a neutral salt of a fixed polybasic acid, which salt, and the acid salt formed by reacting thereupon with sulphuric acid, both are inert to ethyl sulphuric acid and to diethyl sulfate, such salt being added in less than the amount molecularly equivalent to the ethyl sulphuric acid, and while in admixture with a neutral ethyl sulfate of a metal.

15. The process for the production of diethyl sulphate which comprises distilling free ethyl sulphuric acid under reduced pressure with the addition of dry neutral sodium sulphate in smaller amount than the equivalent molecular amount, and with the addition of sodium ethyl sulphate.

16. The process for the production of diethyl sulphate which comprises heating and agitating about 150 parts of dehydrated sodium sulphate in a vessel, gradually adding thereto 252 parts of ethyl sulphuric acid and distilling under a pressure below atmospheric.

17. The process for the production of diethyl sulphate which comprises heating and stirring 150 parts of dehydrated sodium sulphate gradually adding thereto about 252 parts of ethyl sulphuric acid and distilling under an absolute pressure of about 15 mm. mercury.

18. The process for the production of diethyl sulfate which comprises heating and stirring a mixture of 20 parts of dehydrated sodium sulfate and 111 parts of dry sodium ethyl sulfate, adding gradually to the heated mixture 126 part of ethyl sulphuric acid and distilling under an absolute pressure of about 15 mm. mercury.

In testimony whereof I have affixed my signature.

ERWIN KUH.